US011260350B2

(12) United States Patent
Noguchi (10) Patent No.: US 11,260,350 B2
(45) Date of Patent: Mar. 1, 2022

(54) SEPARATION MEMBRANE MODULE

(71) Applicant: Mitsubishi Chemical Corporation, Tokyo (JP)

(72) Inventor: Naoki Noguchi, Tokyo (JP)

(73) Assignee: Mitsubishi Chemical Corporation, Tokyo (JP)

( * ) Notice: Subject to any disclaimer, the term of this patent is extended or adjusted under 35 U.S.C. 154(b) by 0 days.

(21) Appl. No.: 17/128,585

(22) Filed: Dec. 21, 2020

(65) Prior Publication Data

US 2021/0170339 A1   Jun. 10, 2021

Related U.S. Application Data

(63) Continuation of application No. PCT/JP2019/025129, filed on Jun. 25, 2019.

(30) Foreign Application Priority Data

Jun. 26, 2018  (JP) .............................. JP2018-121043

(51) Int. Cl.
*B01D 53/22* (2006.01)
*B01D 63/06* (2006.01)
(Continued)

(52) U.S. Cl.
CPC .............. *B01D 63/06* (2013.01); *B01D 69/04* (2013.01); *B01D 69/10* (2013.01);
(Continued)

(58) Field of Classification Search
CPC ............ B01D 2313/08; B01D 2319/04; B01D 2313/21; B01D 69/10; B01D 63/06;
(Continued)

(56) References Cited

U.S. PATENT DOCUMENTS 3,040,572 A * 6/1962 Henderson ................ G01F 3/38
73/200
3,212,232 A * 10/1965 McMinn ............ B01D 19/0057
95/243

(Continued)

FOREIGN PATENT DOCUMENTS

JP        52-81078       7/1977
JP        55-65103 U     5/1980
(Continued)

OTHER PUBLICATIONS

International Search Report dated Sep. 24, 2019 in PCT/JP2019/025129 filed Jun. 25, 2019, citing documents AA-AB and AK-AU therein, 2 pages.

*Primary Examiner* — Anthony R Shumate
(74) *Attorney, Agent, or Firm* — Oblon, McClelland, Maier & Neustadt, L.L.P.

(57) ABSTRACT

A separation membrane module that is provided enables a bending load that is applied to a support member that supports ends of tubular separation membranes to be decreased and enables a seal member between the outer circumferential surface of the support member and the inner circumferential surface of a housing to be omitted. The separation membrane module includes a tubular housing 2, tubular separation membranes 3 that are arranged in a longitudinal direction of the housing 2, end tubes 4 that are connected to the lower ends of the tubular separation membranes 3, a support box 5 that supports the end tubes 4, and a backpressure chamber 16 below the support box 5. The tubular separation membranes 3 are in communication with a collection chamber 5v of the support box 5. A permeated fluid is extracted via a nozzle 5n that is disposed on the support box 5. A chamber 11 and the backpressure chamber 16 are in communication with each other via a gap between the outer circumferential surface of the support box 5 and the (Continued)

inner circumferential surface of the housing 2. Pressure in the chamber 11 and pressure in the chamber 16 are substantially the same.

10 Claims, 10 Drawing Sheets (51) Int. Cl.
    *B01D 69/04*     (2006.01)
    *B01D 69/10*     (2006.01)

(52) U.S. Cl.
    CPC ...... *B01D 2313/08* (2013.01); *B01D 2313/12* (2013.01); *B01D 2313/13* (2013.01); *B01D 2313/20* (2013.01); *B01D 2313/21* (2013.01); *B01D 2313/24* (2013.01); *B01D 2313/50* (2013.01); *B01D 2319/04* (2013.01)

(58) Field of Classification Search
    CPC ............ B01D 2313/50; B01D 2313/24; B01D 69/04; B01D 2313/13; B01D 2313/20; B01D 2313/12
    See application file for complete search history.

(56) References Cited

U.S. PATENT DOCUMENTS

| | | | | |
|---|---|---|---|---|
| 3,344,926 | A * | 10/1967 | Barnabe | B01D 61/002 210/321.66 |
| 4,592,848 | A * | 6/1986 | Pabst | B01D 61/18 210/108 |
| 5,468,283 | A * | 11/1995 | French | B01D 53/22 95/45 |
| 11,008,661 | B2 * | 5/2021 | Frimann | F23D 14/38 |
| 2001/0009235 | A1 | 7/2001 | Sakashita et al. | |
| 2004/0238442 | A1 | 12/2004 | Johnson et al. | |
| 2007/0163941 | A1 * | 7/2007 | Kopp | B01D 63/00 210/321.72 |
| 2010/0044309 | A1 * | 2/2010 | Lee | B01D 50/002 210/636 |
| 2010/0219130 | A1 * | 9/2010 | Kopp | B01D 61/027 210/650 |
| 2013/0334139 | A1 * | 12/2013 | Blickhan | A61M 1/0272 210/650 |
| 2015/0166957 | A1 * | 6/2015 | Kusters | A61M 1/3635 435/2 |
| 2017/0232394 | A1 * | 8/2017 | Kutowy | B01D 63/082 210/109 |
| 2020/0108350 | A1 * | 4/2020 | Enomura | B01D 63/063 |

FOREIGN PATENT DOCUMENTS

| | | |
|---|---|---|
| JP | 62-250908 A | 10/1987 |
| JP | 5-7440 A | 1/1993 |
| JP | 10-192661 A | 7/1998 |
| JP | 11-33367 A | 2/1999 |
| JP | 11-262640 A | 9/1999 |
| JP | 11-267471 A | 10/1999 |
| JP | 2006-247438 A | 9/2006 |
| JP | 2010-69361 A | 4/2010 |
| JP | 2016-155093 A | 9/2016 |
| WO | WO 03/024575 A1 | 3/2003 |

* cited by examiner

SEPARATION MEMBRANE MODULE

TECHNICAL FIELD

The present invention relates to a separation membrane module that is used to separate a component part from a fluid such as a solution or mixed gas.

BACKGROUND ART

A known apparatus for separating a component in a solution or mixed gas is a separation membrane module. A tubular separation membrane that is used in the separation membrane module includes a tubular porous support and a porous separation membrane that is disposed on the outer circumferential surface of the support and that is composed of, for example, zeolite. Known methods of separating a specific component from a fluid such as a solution or mixed gas include a method of vaporizing and separating the specific component by bringing the fluid of the solution into a side (an outer surface) of a separation membrane element and decreasing the pressure of the other side (an inner surface), a method of separating the specific component by vaporizing the solution into gas, bringing the gas into the separation membrane, and decreasing the pressure of a non-contact surface, and a method of separating the specific component by bringing the pressurized mixed gas into the separation membrane.

PTL 1 (particularly in FIG. 6(a)) discloses that a separation membrane module includes a tubular housing that is disposed in the vertical direction and tubular separation membranes that are arranged in the vertical direction in the housing, end tubes are connected to lower end portions of the tubular separation membranes, the end tubes protrude from the upper surface of a support plate that is installed such that the support plate crosses the housing, insertion holes are formed on the upper surface of the support plate, and the end tubes are inserted into the insertion holes.

Gas that has permeated through the tubular separation membranes flows into an outflow chamber below the support plate and is retrieved from the outlet chamber via an outlet.

CITATION LIST

Patent Literature

PTL 1: JP2016-155093A

SUMMARY OF INVENTION

Technical Problem

In a structure in PTL 1 in which the end tubes that are connected to the lower ends of the tubular separation membranes are inserted into the insertion holes of the support plate, and the end tubes are supported by a support box, pressure in the outlet chamber below the support plate is lower than pressure in a fluid-processing chamber above the support plate, and a large bending load is applied to the support plate.

The structure in PTL 1 needs sufficient sealing between the outer circumferential surface of the support plate and the inner circumferential surface of the housing in order to prevent gas in a fluid-processing chamber above the support plate from passing through a space between the outer circumferential surface of the support plate and the inner circumferential surface of the housing and leaking to the outlet chamber.

In the case where the modules are installed in series, the structure in PTL 1 also needs a pipe that is interposed between the modules.

It is an object of the present invention to provide a separation membrane module that enables a bending load that is applied to a support member that supports ends of tubular separation membranes to be decreased, that enables a seal member between the outer circumferential surface of the support member and the inner circumferential surface of a housing to be omitted, and that enables a bundle of the membranes to be installed in series in the single module without using a pipe.

Solution to Problem

The separation membrane module of the present invention comprises: a tubular housing; and tubular separation membranes that are arranged in the housing in a longitudinal direction of the housing, a fluid to be processed flowing through a fluid-processing chamber inside the housing in a direction from one end toward another end of the chamber, the fluid that has permeated through the tubular separation membranes being retrieved via the tubular separation membranes, and an end portion of each tubular separation membrane being supported by a support member that is installed in the housing such that the support member extends to cross the housing, wherein the separation membrane module further comprises: a collection chamber that is defined in the support member and that is in communication with an inside of each of the tubular separation membranes; a retrieving member that retrieves the fluid in the collection chamber to outside of the housing; a backpressure chamber that is defined between the support member and an end portion of the housing; and a communication portion that communicates an inside of the backpressure chamber to the fluid-processing chamber.

In one aspect of the present invention, the communication portion is a gap between an outer circumferential surface of the support member and an inner circumferential surface of the housing.

In one aspect of the present invention, a plurality of tubular separation membrane units are disposed in the housing, each unit including the support member and the tubular separation membranes connected thereto; and the collection chamber of the tubular separation membrane unit nearest to the backpressure chamber is communicated to the collection chamber of the other tubular separation membrane unit via a connection member.

In one aspect of the present invention, the connection member is a nozzle that extends from the support member.

In one aspect of the present invention, the nozzle extends from each support member, and the nozzle of the tubular separation membrane unit and the nozzle of the tubular separation membrane unit adjacent thereto are coupled with each other.

In one aspect of the present invention, the separation membrane module further comprises a bearing member that bears the nozzle on the inner circumferential surface of the housing.

In one aspect of the present invention, the bearing member includes a rolling member that is in contact with the inner circumferential surface of the housing and that is capable of rolling.

In one aspect of the present invention, the rolling member is pressed against the inner circumferential surface of the housing by using an elastic member.

In one aspect of the present invention, a deformation-preventing member that prevents the support member from deforming is disposed in the collection chamber.

In one aspect of the present invention, the collection chamber is defined by two or more members.

Advantageous Effects of Invention

In a separation membrane module according to the present invention, the backpressure chamber is defined between the support member and an end portion of the housing, the backpressure chamber is in communication with the fluid-processing chamber, and pressure in the backpressure chamber and pressure in the fluid-processing chamber are substantially the same. For this reason, a bending load that is applied to the support member due to the pressure of a fluid to be processed is eliminated or very small. According to the present invention, it is not necessary to dispose a seal member between the outer circumferential surface of the support member and the inner circumferential surface of the backpressure chamber. The separation membrane module according to the present invention has the collection chamber in which a component part in the fluid to be processed that has permeated through the tubular separation membranes is collected. Accordingly, bundles can be installed in series in the single module, and there is no need for a pipe that is needed for an existing module. Accordingly, costs can be reduced, installation can be facilitated, and maintenance can be facilitated.

BRIEF DESCRIPTION OF DRAWINGS

FIG. 11b is a sectional view taken along line XIb-XIb in FIG. 11a.

DESCRIPTION OF EMBODIMENTS

A separation membrane module according to an embodiment of the present invention will be described with reference to FIG. 1 to FIG. 4.

Figure 1:
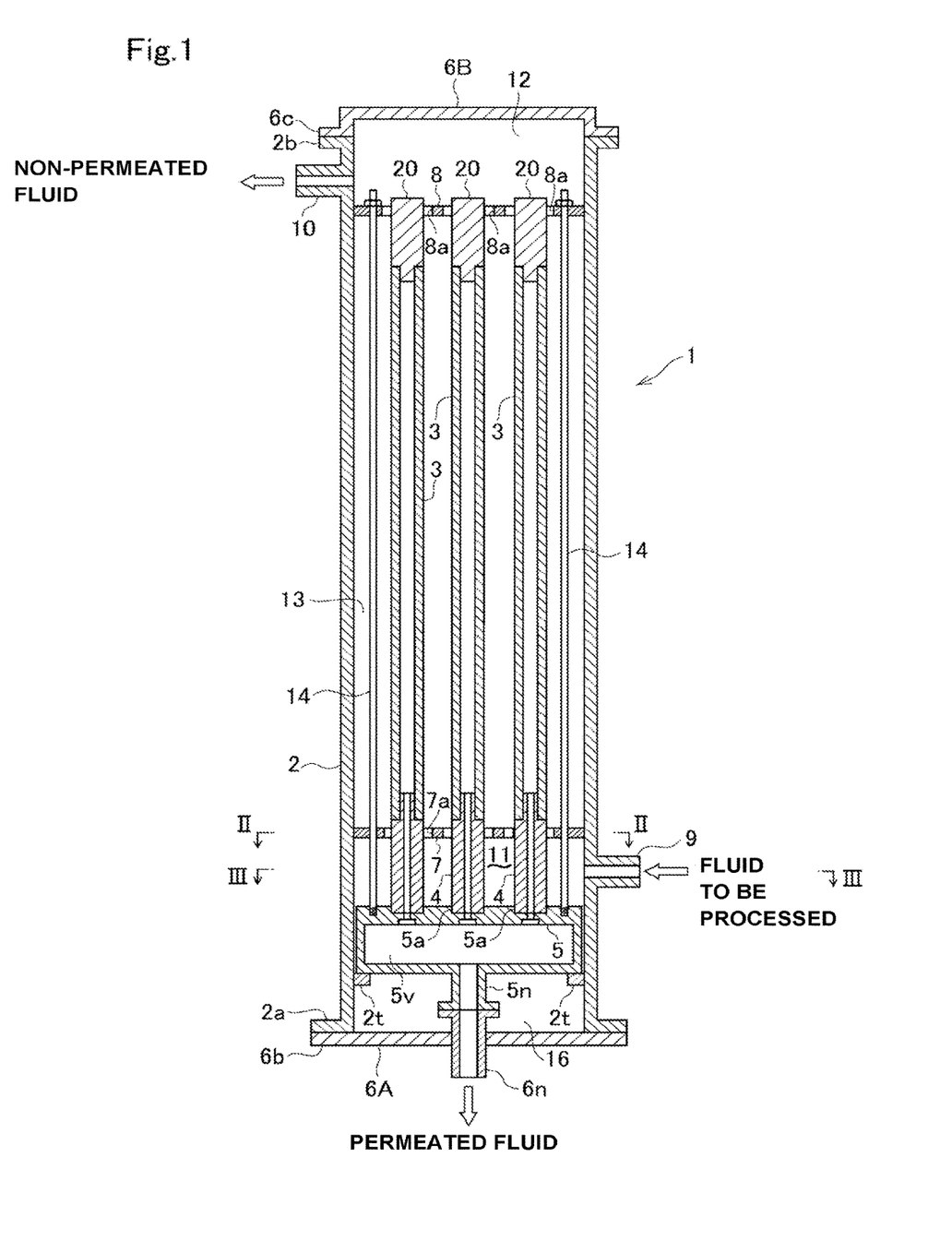
FIG. 1 is a sectional view of a separation membrane module according to an embodiment taken along the axis of a housing.

A separation membrane module 1 includes a housing 2 that has a cylindrical tube shape a cylinder axis direction of which coincides with the vertical direction, tubular separation membranes 3 that are arranged parallel to the axis of the housing 2, a support box 5 that is disposed in a lower portion in the housing 2 and that serves as a support member, a bottom cover 6A that is mounted on the lower end of the housing 2, a top cover 6B that is mounted on the upper end, a first baffle (a baffle plate) 7 and a second baffle (a baffle plate) 8 that are parallel to the support box 5 and that are disposed in the lower portion and an upper portion in the housing 2, and so on. The first baffle 7 is disposed above the support box 5.

According to the embodiment, flanges 2a, 2b, 6b, and 6c that extend outward are disposed on the lower end and the upper end of the housing 2 and the outer edges of the bottom cover 6A and the top cover 6B, and these are secured with bolts (not illustrated).

A gap through which gas can flow is formed between the outer circumferential surface of the support box 5 and the inner circumferential surface of the housing 2. The support box 5 is placed on support 2t that project from the inner circumferential surface of the housing 2. A backpressure chamber 16 is between the support box 5 and the bottom cover 6A. The backpressure chamber 16 is in communication with a chamber 11 above the support box 5 via the gap between the outer circumferential surface of the support box 5 and the inner circumferential surface of the housing 2.

Figure 2:
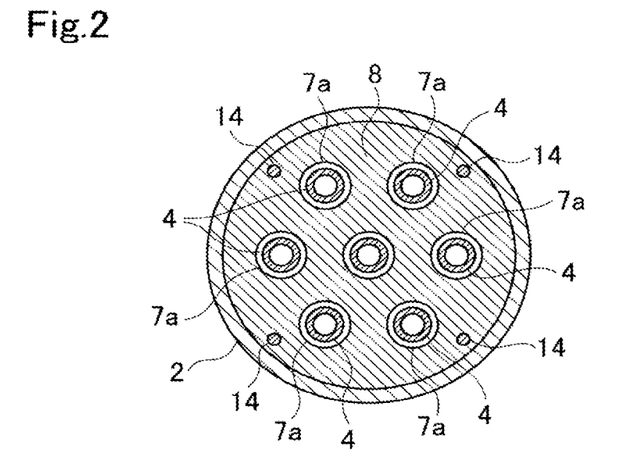
FIG. 2 is a sectional view taken along line II-II in FIG. 1.
Figure 3:
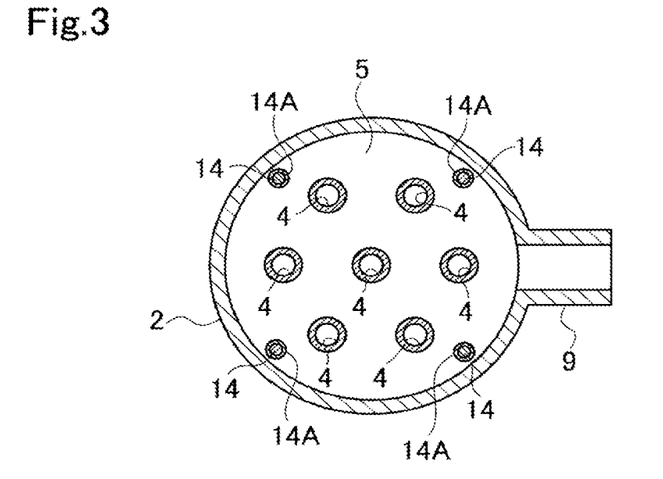
FIG. 3 is a sectional view taken along line III-III in FIG. 1.
Figure 4:
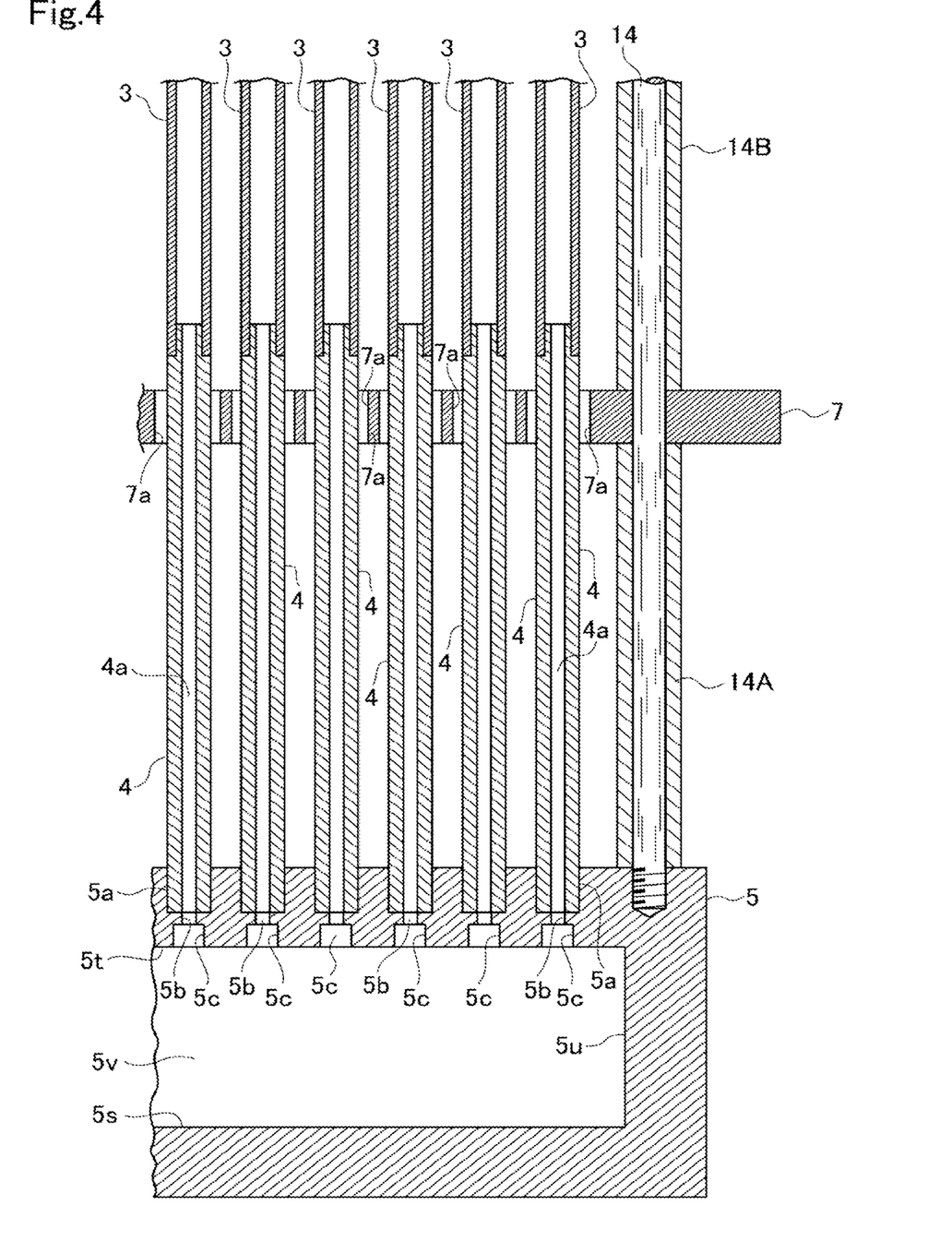
FIG. 4 is an enlarged sectional view of end tubes and a support box.

According to the embodiment, end tubes 4 are coupled with the lower ends of the tubular separation membranes 3. End plugs 20 are coupled with the upper ends of the tubular separation membranes 3. In FIG. 1 to FIG. 3, the number of the tubular separation membranes illustrated is 7. However, a large number of the tubular separation membranes are actually provided as illustrated in FIG. 4.

In FIG. 1, each tubular separation membrane 3 has a single body. However, multiple tubular separation membranes 3, for example, two tubular separation membranes 3 may be coupled with a joint tube interposed therebetween.

An inlet 9 for a fluid to be processed is formed through the outer circumferential surface of a lower portion of the housing 2, and an outlet 10 for the fluid to be processed is formed through the outer circumferential surface of the upper portion. The inlet 9 is formed so as to face the chamber 11 between the support box 5 and the first baffle 7. The outlet 10 is formed so as to face a chamber 12 above the second baffle 8. A fluid-processing chamber 13 is defined between the baffles 7 and 8. The fluid-processing chamber is also referred to below as a main chamber.

Figure 10:
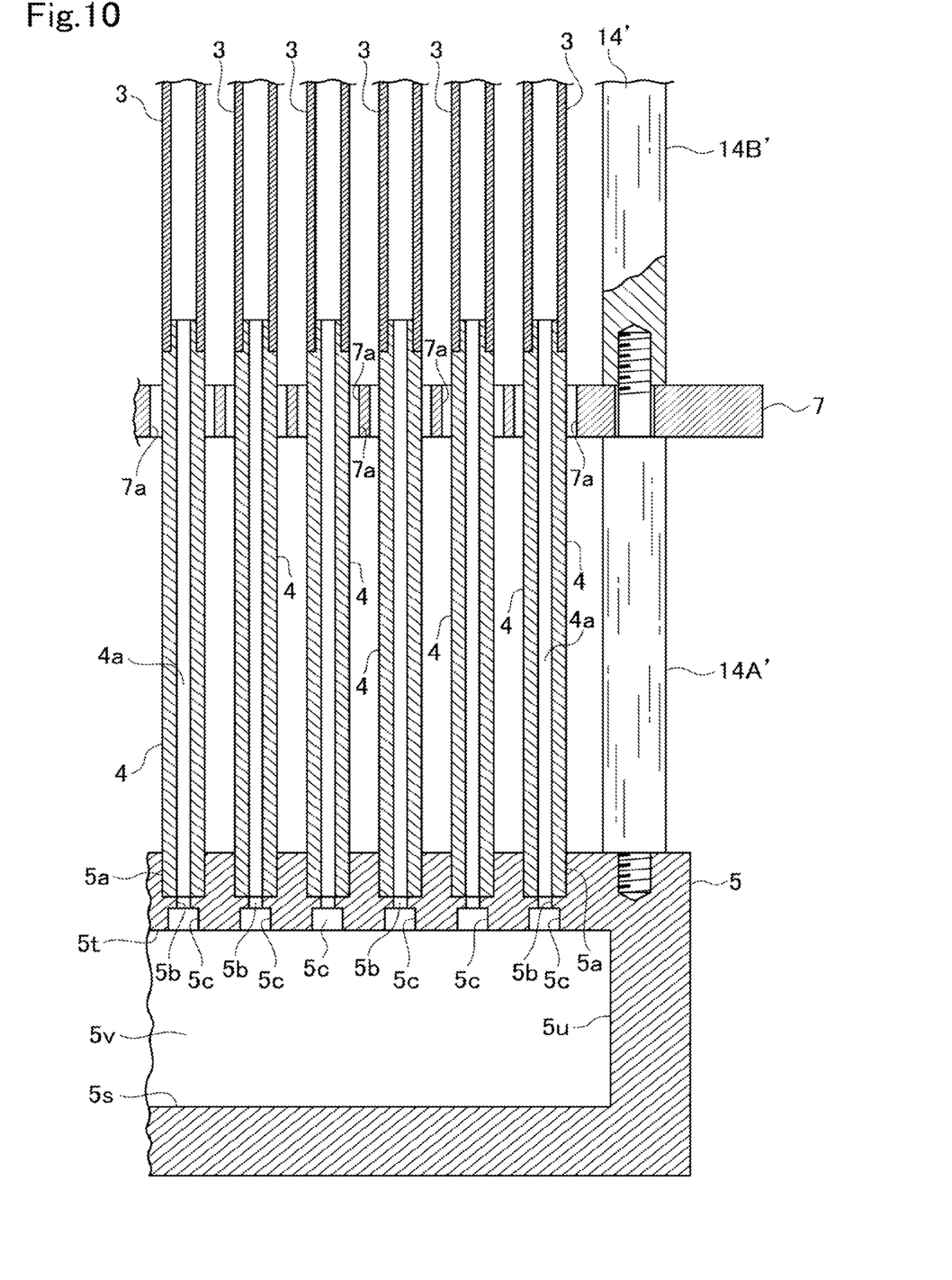
FIG. 10 is a sectional view illustrating of another form of a part in FIG. 4.

Rods 14 extend upward from the support box 5 in a bottom portion, and the baffles 7 and 8 are supported by the rods 14. In FIG. 2 and FIG. 3, the number of the rods 14 disposed is 4, but is not limited thereto and may be, for example, 2 to 3 or 5 or more. An external thread is formed on the lower end of each rod 14 and is screwed along an internal thread of the support box 5. The baffles 7 and 8 are supported at predetermined heights by using sheath tubes 14A and 14B (FIG. 4) into which the rods 14 are fitted. The sheath tubes 14A are disposed between the support box 5 and the baffle 7. The sheath tubes 14B are disposed between the baffles 7 and 8. The baffle 8 is placed on the upper end surface of each sheath tube 14B and is secured by using a nut that is screwed at the upper end of each rod 14. A method of securing the baffles is not limited thereto, and rods 14A' and 14B' may be coupled and secured by using screws as in a rod 14' illustrated in FIG. 10. The number of the baffles is not limited by the embodiment, and three or more baffles, for example, may be used.

Seal members such as O-rings, V-packings, or C-rings may be interposed between the outer circumferential surfaces of the baffles 7 and 8 and the inner circumferential surface of the housing 2 such that gas does not preferentially flow along an outer circumferential portion of the housing 2.

The baffles 7 and 8 have circular through-holes 7a and 8a into which the tubular separation membranes 3 are inserted, and coupling bodies of the tubular separation membranes 3, the end tubes 4, and the end plugs 20 are inserted in the through-holes 7a and 8a. The inner diameters of the through-holes 7a and 8a are larger than the diameters (the outer diameters) of the tubular separation membranes 3, the end tubes 4, and the end plugs 20, and gaps are formed between the inner circumferential surfaces of the through-holes 7a and 8a and the end tubes 4 and between the inner circumferential surfaces of the through-holes 7a and 8a and the outer circumferential surfaces of the end plugs 20 over the entire circumference.

As illustrated in FIG. 1 and FIG. 4, the support box 5 includes a box body that has a top 5t, a bottom 5s, and a side surface 5u and has a collection chamber 5v for gas therein. A nozzle 5n through which the gas in the collection chamber 5v flows out is formed through the bottom 5s. An extraction nozzle 6n that is coupled with the nozzle 5n with, for example, a flange joint and that serves as an extraction member is formed so as to extend through the bottom cover 6A.

In the collection chamber 5v, a deformation-preventing member that prevents the support box 5 from deforming may be disposed. When differences in pressure between the main chamber 13 and the collection chamber 5v, between the chamber 11 and the collection chamber 5v, and between the backpressure chamber 16 and the collection chamber 5v are large, the deformation-preventing member can prevent the support box 5 from deforming. When the differences in pressure are 10 times or more although this depends on the size and throughput of the module, and the deformation-preventing member is provided, the support box 5 can be effectively prevented from deforming.

The shape of the deformation-preventing member may be any shape provided that the support box 5 can be prevented from deforming but is preferably a shape that connects the top 5t and the bottom 5s to each other such that the top 5t and the bottom 5s can be prevented from deforming. The deformation-preventing member may be an elastic member such as a columnar member or a spring. The deformation-preventing member is preferably a columnar member because the columnar member is typically easy to obtain. A section of the columnar member may be a solid section or a hollow section. A hollow deformation-preventing member is lightweight and can effectively prevent compressive deformation. A solid deformation-preventing member is easy to obtain. A sectional shape of the columnar member may be circular or rectangular. A circular shape is preferable because of ease of obtaining.

The deformation-preventing member may be provided such that holes are formed on the lower surface of the top 5t and the upper surface of the bottom 5s, the upper end of the deformation-preventing member is engaged with the hole of the top 5t, and the lower end of the deformation-preventing member is engaged with the hole of the bottom 5s. An internal thread may be formed on an inner circumferential surface around a hole, an external thread may be formed on the outer circumferential surface of an end portion of a rod-like or tubular deformation-preventing member, and the deformation-preventing member may be screwed in the hole.

The support box 5 may include two or more members in order to readily install the deformation-preventing member. For example, the top 5t or the bottom 5s may be removable, or a portion near the top 5t and a portion near the bottom 5s may be equally divided. The two or more members may be integrally formed by welding, may be integrally formed by fastening from the outside with flanges provided, or may be screwed together with an internal thread formed on the side surface in a direction from the top 5t toward the bottom 5s. In the case where the two or more members are not welded, a gasket or an O-ring is preferably provided to ensure airtightness.

Figure 12:
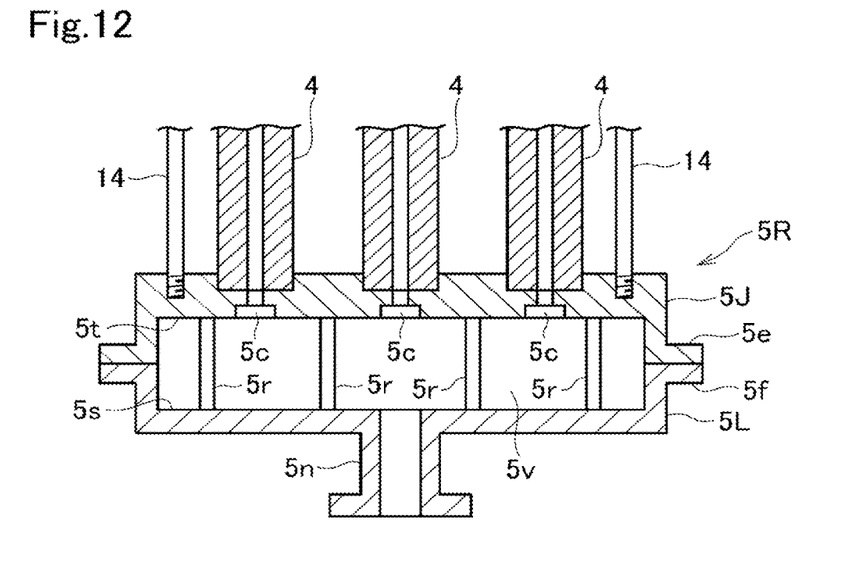
FIG. 12 illustrates a longitudinal section of a support box that includes a deformation-preventing member.

FIG. 12 illustrates an example of the support box that includes the deformation-preventing members. A support box 5R is obtained by coupling an upper half body 5J and a lower half body 5L. A flange 5e that is disposed on the lower edge of the upper half body 5J and a flange 5f that is disposed on the upper edge of the lower half body 5L are stacked and coupled with each other. Deformation-preventing members 5r are disposed between the top 5t and the bottom 5s. The other components of the support box 5R are the same as those of the support box 5 illustrated in FIG. 1, and like reference signs represent like components.

The projections 2t on which the support box 5 is disposed as described above may be omitted. For example, a support (not illustrated) may extend upward from the bottom cover 6A, the support box 5 may be supported by the support in order to increase the strength of the support box 5. The support is preferably between the top 5t and the bottom 5s so as not to completely cover large holes 5c, and the single support or multiple supports may be provided.

Insertion holes 5a in which the lower ends of the end tubes 4 that are coupled with the tubular separation membranes 3 are inserted are formed on the top 5t of the support box 5. Each insertion hole 5a has a columnar shape and extends from the upper surface of the support box 5 to an intermediate position in a thickness direction. The bottoms of the insertion holes 5a face the collection chamber 5v with small holes 5b and large holes 5c interposed therebetween (or there may be only the small holes 5b without the large holes 5c).

Gaskets (not illustrated) are interposed between the lower end surfaces of the end tubes 4 and the bottoms of the insertion holes 5a. Alternatively, O-rings (not illustrated) are interposed between the side surfaces of the end tubes 4 and side surfaces around the insertion holes 5a.

As illustrated in FIG. 4, tube holes 4a of the end tubes 4 are in communication with the collection chamber 5v with the small holes 5b and the large holes 5c interposed therebetween. Joints between the end tubes 4 and the tubular separation membranes 3 are sealed by using gaskets, O-rings, or thermal shrink tubes.

The end plugs 20 are coupled with the upper ends of the tubular separation membranes 3. The end plugs 20 have a columnar shape or a shape obtained by cutting the columnar shape and seal the upper ends of the tubular separation membranes 3. Small-diameter portions that are inserted in the tubular separation membranes 3 are disposed at the lower ends of the end plugs 20. Spaces between the end plugs 20 and the tubular separation membranes 3 are sealed by gaskets or O-rings. The spaces between the end plugs 20 and the tubular separation membranes 3 may be sealed by using thermal shrink tubes although an illustration thereof is omitted.

According to the present invention, the end tubes 4 and the support box 5 may be disposed near the upper ends of the tubular separation membranes 3, and the end plugs 20 may be disposed near the lower ends of the tubular separation membranes 3.

In the separation membrane module 1, the fluid to be processed is introduced into the chamber 11 of the housing 2 via the inlet 9, passes through gaps between inner circumferential surfaces around through-holes 7a of the baffle 7 and the outer circumferential surfaces of the end tubes 4, flows into the main chamber 13, passes through the main chamber 13, subsequently passes through gaps between the through-holes 8a of the baffle 8 and the end plugs 20, and flows out to the chamber 12. While the fluid to be processed flows through the main chamber 13, a component part therein permeates through the tubular separation membranes 3 and is extracted from inside of the tubular separation membranes 3 via the collection chamber 5v and the nozzles 5n and 6n. The fluid that has not permeated flows out of the outlet 10 to outside the separation membrane module 1.

According to the embodiment, the backpressure chamber 16 and the chamber 11 are in communication with each other via the gap between the outer circumferential surface of the support box 5 and the inner circumferential surface of the housing 2, and there is no difference in pressure between the chambers, or the difference is very small. Accordingly, a bending load that is applied to the support box 5 is very small. In addition, there is no need for a member that seals the space between the outer circumferential surface of the support box 5 and the inner circumferential surface of the housing 2.

The direction of flow in the main chamber 13 and the direction of flow in the tubular separation membranes 3 may be the same or may be opposite, and the inlet 9 and the outlet 10 for the fluid to be processed may be replaced with each other.

As illustrated in FIG. 1, the separation membrane module 1 may be used with the top cover 6B facing upward or may be used with the bottom cover 6A facing upward. The separation membrane module 1 may be used so as to be installed sideways such that a direction in which the bottom cover 6A and the top cover 6B are connected to each other is substantially horizontal.

According to the embodiment, a large number of the tubular separation membranes 3 are installed so as to be parallel to each other, and a membrane area is large. Accordingly, membrane separation is efficiently performed.

According to the embodiment, the end tubes 4 and the end plugs 20 that are coupled with the upper and lower ends of the tubular separation membranes 3 are inserted in the through-holes 7a and 8a of the baffles 7 and 8. For this reason, even when the tubular separation membranes 3 vibrate or swing, and the end tubes 4 and the end plugs 20 come into contact with the inner circumferential surfaces of the through-holes 7a and 8a, zeolite membranes are not damaged, and operation can stably continue for a long period of time.

Another embodiment of the present invention will be described with reference to FIG. 5.

As for a separation membrane module 1A according to the embodiment, tubular separation membrane units 30 and 31 are disposed in the housing 2. The tubular separation membrane unit 30 includes the support box 5, the end tubes 4, the tubular separation membranes 3, the end plugs 20, the baffles 7 and 8, and the rods 14 in FIG. 1 to FIG. 4.

The tubular separation membrane unit 31 is almost the same as the tubular separation membrane unit 30 but differs in that a communication nozzle 5i that serves as a connection member extends upward from the center of the top 5t of the support box 5. The upper end of the communication nozzle 5i extends to a position higher than that of the baffle 8 of the tubular separation membrane unit 31, and the upper end thereof is coupled with the lower end of the nozzle 5n of the tubular separation membrane unit 30 by using, for example, a screw joint or a flange joint.

Gaps through which an upper chamber and a lower chamber are in communication with each other and gas can flow are formed between the outer circumferential surfaces of the support boxes 5 of the tubular separation membrane units 30 and 31 and the inner circumferential surface of the housing 2.

The other components of the separation membrane module 1A are the same as those of the separation membrane module 1, and like reference signs represent like components. Also, in the separation membrane module 1A, the fluid to be processed flows into the housing 2 via the inlet 9, a specific component permeates through the tubular separation membranes 3, and a non-permeated fluid flows out via the outlet 10. Gas that has permeated through the tubular separation membranes 3 of the lower tubular separation membrane unit 31 flows into the collection chamber 5v in the support box 5 of the tubular separation membrane unit 31 and is extracted via the nozzles 5n and 5i. Gas that has permeated through the tubular separation membranes 3 of the upper tubular separation membrane unit 30 flows into the collection chamber 5v of the support box 5 of the tubular separation membrane unit 30, flows into the collection chamber 5v in the support box 5 of the lower tubular separation membrane unit 31 via the nozzles 5n and 5i, and is extracted via the nozzles 5n and 6n.

As for the separation membrane module 1A, the length of the housing 2 can be increased, and the tubular separation membrane units can be disposed in the housing 2. In FIG. 5, the single tubular separation membrane unit 30 and the single tubular separation membrane unit 31 are illustrated. However, the tubular separation membrane units 31 may be coupled with each other in up-and-down multistage arrangement, and the tubular separation membrane unit 30 may be coupled with the top portion. Alternatively, the tubular separation membrane units 31 may be coupled with each other in up-and-down multistage arrangement, and the nozzle 5i at the top stage may be sealed by using, for example, a cap or a flange. This enables components to be the units that have the same structure and enables costs to be reduced.

Figure 6:
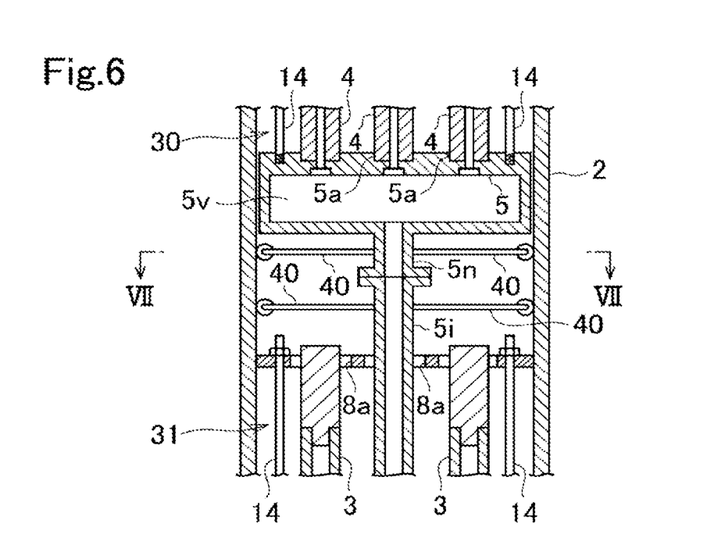
FIG. 6 is an enlarged view of a part in FIG. 5.
Figure 7:
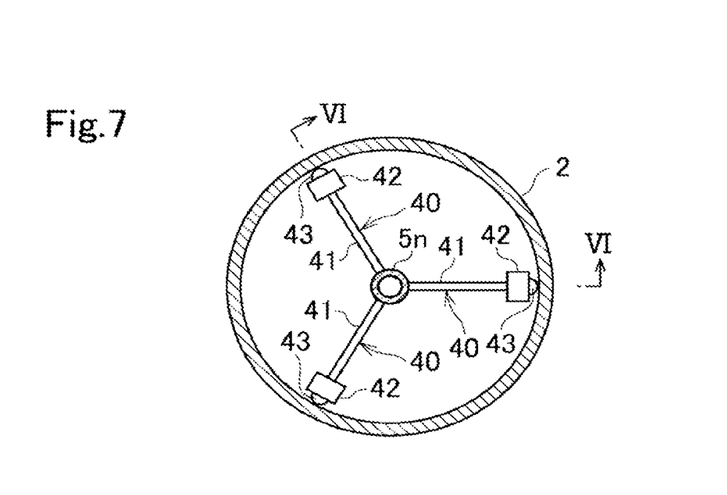
FIG. 7 is a sectional view taken along line VII-VII in FIG. 6.

In the case where the tubular separation membrane units are installed in the vertical direction, the upper tubular separation membrane unit is supported by the lower tubular separation membrane unit. In this case, however, a bearing member that prevents the tubular separation membrane units from inclining or swinging from side to side may be provided. FIG. 6 and FIG. 7 illustrate an example thereof in which bearing members 40 extend in radial directions from one or both of the nozzles 5n and 5i (both in the case of FIG. 6). The bearing members 40 include rods 41, base ends of which are mounted on the nozzles 5n and 5i, ball holders 42 on ends of the rods 41, and rolling members such as balls 43 that are held by the ball holders 42 and that are capable of rolling. The rods 41 include elastic members such as springs (not illustrated), and the ball holders 42 are urged in the radial directions. Consequently, the balls 43 are pressed against the inner circumferential surface of the housing 2, and the nozzles 5n and 5i are held at the position of the axis of the housing 2. When the tubular separation membrane units 30 and 31 are taken out or put into the housing 2, the balls 43 roll along the inner circumferential surface of the housing 2. FIG. 7 illustrates a section taken along line VII-VII in FIG. 6. FIG. 6 illustrates a section taken along line VI-VI in FIG. 7.

In FIG. 6 and FIG. 7, the balls 43 are used. However, rollers may be used.

Figure 11A:
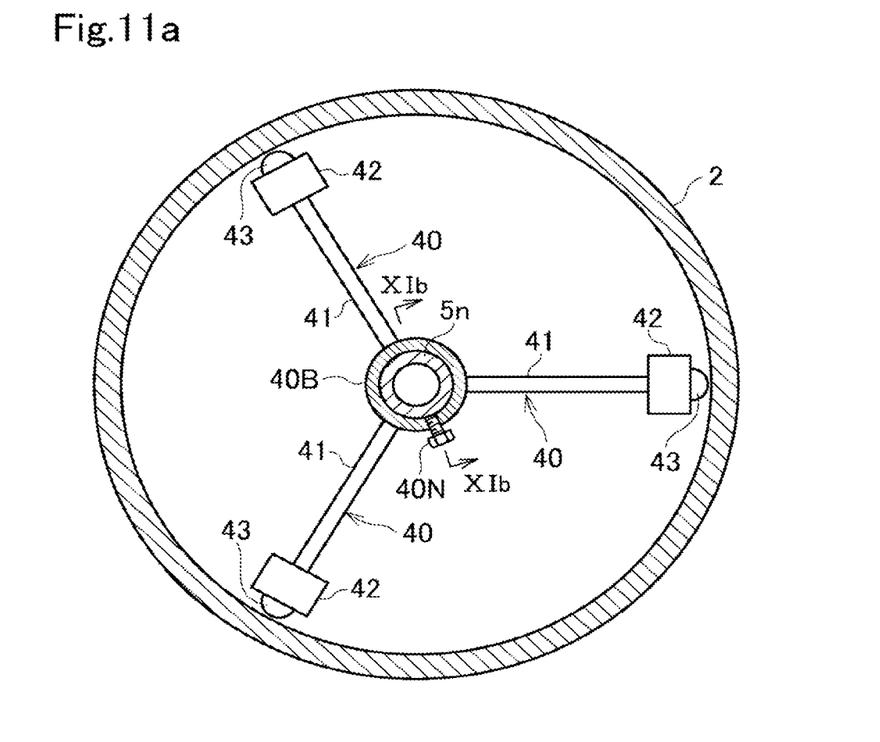
FIG. 11a is a sectional view illustrating another form for FIG. 6 and FIG. 7.
Figure 11B:
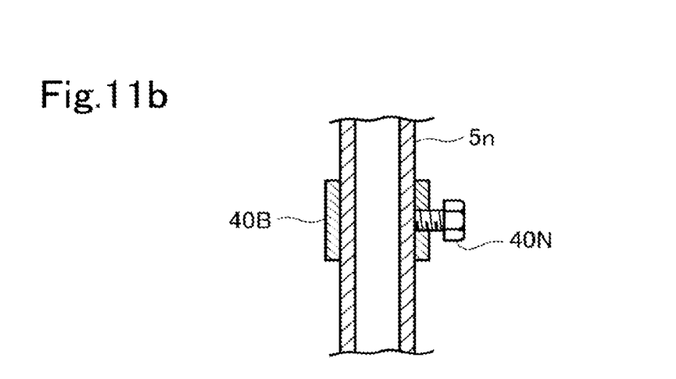

In FIG. 6 and FIG. 7, the base ends of the rods 41 are directly mounted on the nozzles 5n and 5i. However, as illustrated in FIG. 11a and FIG. 11b, a tubular boss 40B may be mounted on the nozzle 5n (or 5i), and the rods 41 may be mounted on the boss 40B. An example of a method of securing the boss 40B to the nozzle 5n (or 5i) involves forming a tapped hole in the boss 40B and securing the boss 40B by using a screw 40N from the outside of the boss 40B. A flange portion and a joint portion that are installed on a nozzle end portion are preferably removable by, for example, screwing in order to facilitate mounting and removing of the boss 40B.

In the case where the separation membrane module 1 is installed sideways such that the direction in which the bottom cover 6A and the top cover 6B are connected to each other is substantially horizontal, a dispersion plate or the support box 5 of a bundle (a combination of, for example, the separation membranes, the end tubes, and the support box) that is inserted in the housing 2 comes into contact with the inner wall of the housing 2 in some cases. The heavier the bundle, the more the frictional force of the contact. This makes it difficult to push the bundle therein in some cases.

Figure 8:
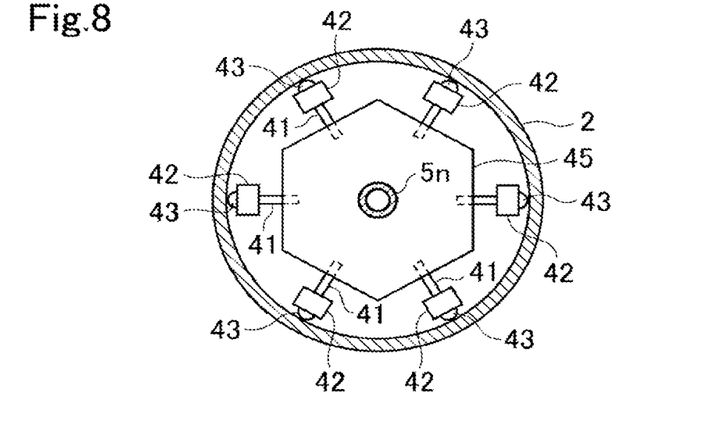
FIG. 8 is a sectional view illustrating another support mechanism.

In view of this, as illustrated in FIG. 8, a base plate 45 may be mounted on the nozzle 5n (or 5i), and the rods 41 may be mounted on the base plate 45. The rods 41 may be omitted, and the ball holders 42 may be directly disposed on the base plate 45. The thicknesses of the rods that support the weight of the bundle can be decreased by decreasing the lengths of the rods 41. Even when the bundle rotates during insertion of the bundle into the housing 2, the balls can always be located between the bundle and the housing 2 by increasing the number of the ball holders 42, and this facilitates the insertion.

Figure 9:
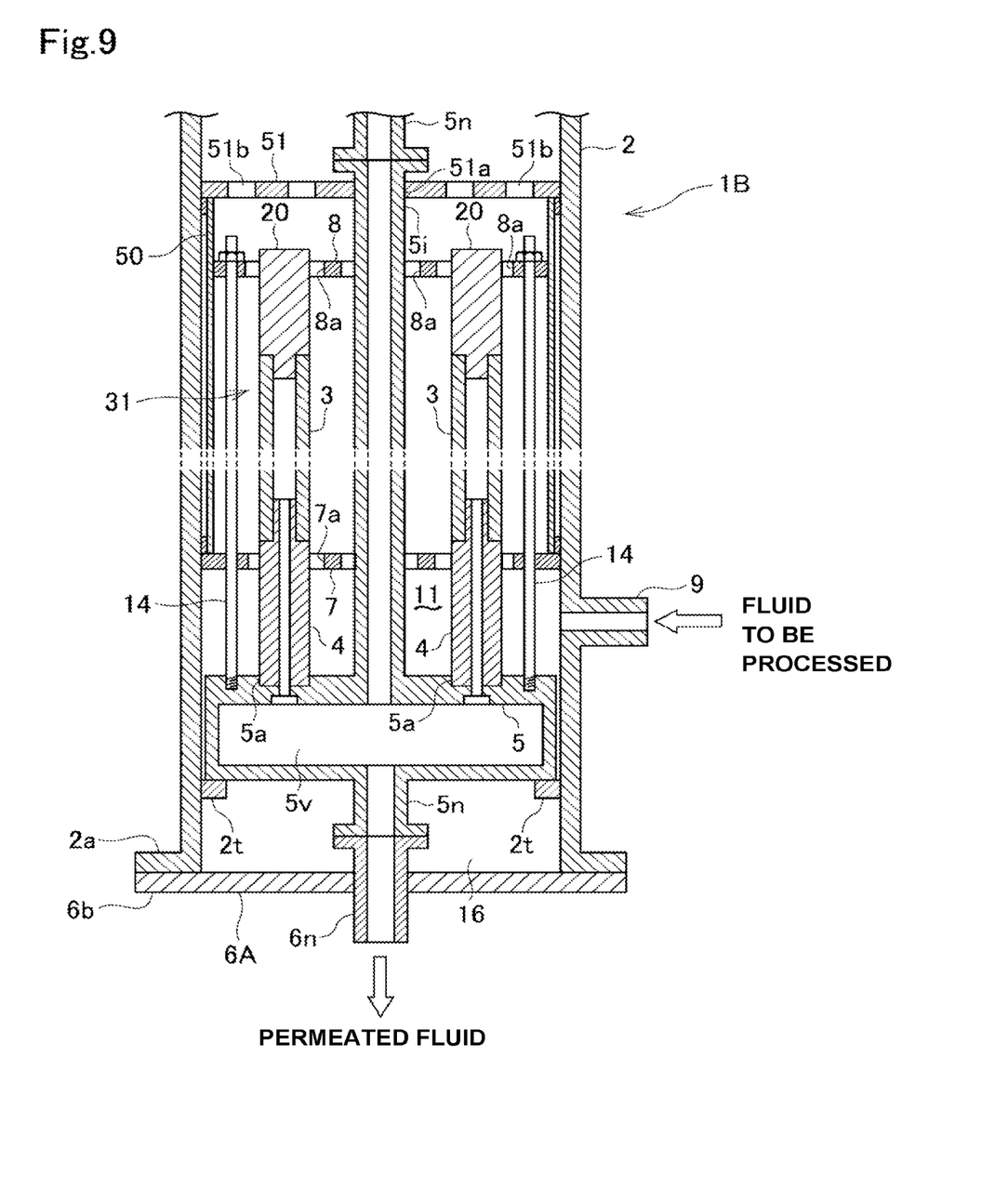
FIG. 9 is a sectional view of a part of a separation membrane module according to another embodiment taken along the axis of the housing.

According to the present invention, a tubular body 50 that surrounds the tubular separation membrane unit 31 may be disposed so as to be along the inner circumferential surface of the housing 2, a baffle 51 may be supported on the upper end of the tubular body 50, the nozzle 5i may be inserted in a center hole 51a of the baffle 51, and the upper portion of the nozzle 5i may be supported by the baffle 51 as in a separation membrane module 1B in FIG. 9. The outer circumferential surface of the support box 5 and the outer circumferential surface of the baffle 51 are slightly spaced from or are in contact with the inner circumferential surface of the housing 2. The baffle 51 has a large number of openings 51b that extend from the top to the bottom thereof. A layer composed of a slidable material such as fluorine resin is preferably disposed on the outer circumferential surfaces of the support box 5 and the baffle 51 in order to decrease resistance when the bundle is inserted. The lower end of the tubular body 50 is in contact with the upper surface of the baffle 7.

Figure 5:
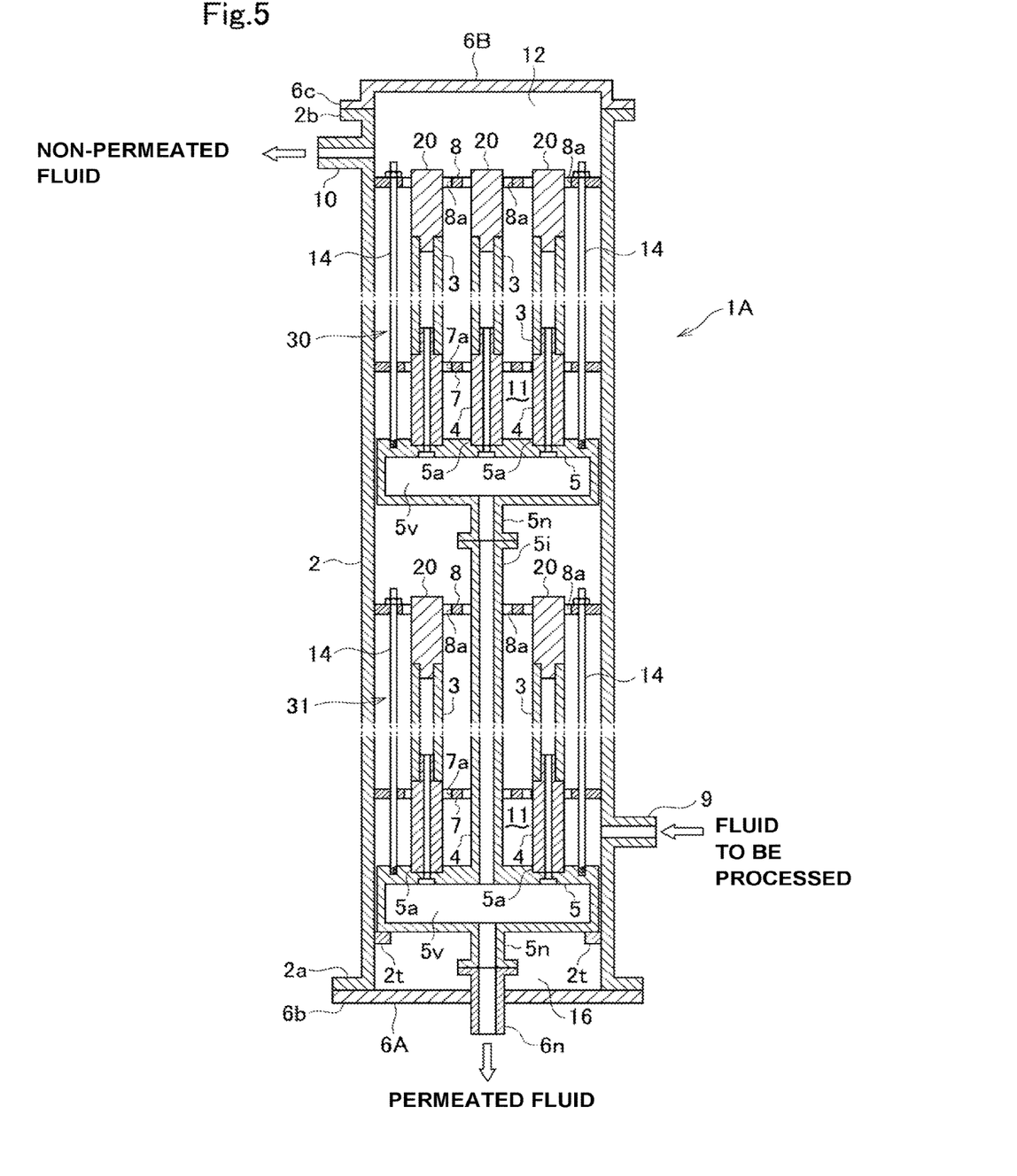
FIG. 5 is a sectional view taken along the axis of the housing of a separation membrane module according to another embodiment.

The other components in FIG. 9 are the same as those in FIG. 5, and like reference signs represent like components.

According to the embodiment described above, the chambers 11 and 16 are in communication with each other via the gap between the outer circumferential surface of the support member and the inner circumferential surface of the housing. A communication portion such as a pipe via which the chambers 11 and 16 are in communication with each other may be disposed in the housing 2. Alternatively, the top 5t and the bottom 5s may be coupled with each other by using a single pipe or pipes.

Preferred materials of the end tubes 4, the end plugs 20, and the tubular separation membranes 3 that are included in a separation membrane module according to the present invention will now be described.

Examples of the materials of the end tubes 4 and the end plugs 20 include a material through which the fluid does not permeate such as metal or ceramics, but are not limited thereto. The materials of the baffles 7, 8, and 51, and a joint tube 17 are typically a metal material such as stainless steel but are not particularly limited provided that the material has resistance against a supply or permeation component and heat resistance in separation conditions and can be replaced with another material such as a resin material depending on use.

Each tubular separation membrane 3 preferably includes a tubular porous support and a zeolite membrane that serves as an inorganic separation membrane that is formed on the outer circumferential surface of the porous support. As for the material of the tubular porous support, an inorganic porous support composed of a sintered metal body or a sintered ceramic body containing silica, α-alumina, γ-alumina, mullite, zirconia, titania, yttria, silicon nitride, or silicon carbide is taken as an example. Among these, an inorganic porous support containing at least one selected from alumina, silica, and mullite. The average diameter of narrow holes on the surface of the porous support is not particularly limited but is preferably controlled and is in the range of typically 0.02 μm or more, preferably 0.05 μm or more, more preferably 0.1 μm or more, and typically 20 μm or less, preferably 10 μm or less, more preferably 5 μm or less.

Zeolite is crystalized on the surface of the porous support and the zeolite membrane is formed.

The main zeolite of which the zeolite membrane is composed includes zeolite that typically has an oxygen 6-to-10-membered ring structure and preferably includes zeolite that has an oxygen 6-to-8-membered ring structure.

The value of n of the zeolite that has an oxygen re-membered rings described herein represents the maximum number of oxygen atoms in the narrow holes composed of T elements and oxygen for forming a zeolite framework. For example, in the case where there are narrow holes of oxygen 12-membered rings and oxygen 8-membered rings as in NOR zeolite, this is regarded as zeolite of oxygen 12-membered rings.

Examples of the zeolite that has an oxygen 6-to-10-membered ring structure include AEI, AEL, AFG, ANA, BRE, CAS, CDO, CHA, DAC, DDR, DOH, EAB, EPI, ESV, EUO, FAR, FRA, FER, GIS, GIU, GOO, HEU, IMF, ITE, ITH, KFI, LEV, LIO, LOS, LTN, MAR, MEP, PIER, MEL, MFI, MFS, MON, MSO, MTF, MTN, MTT, MWW, NAT, NES, NON, PAU, PHI, RHO, RRO, RTE, RTH, RUT, SGT, SOD, STF, STI, SIT, TER, TOL, TON, TSC, TUN, UFI, VNI, VSV, WEI, and YUG.

The zeolite membrane may be a membrane composed of zeolite alone, a membrane that is formed by dispersing powder of the zeolite in a binder such as a polymer, or a zeolite membrane composite obtained by bonding zeolite to various kinds of supports in a membrane form. A part of the zeolite membrane may contain an amorphous component.

The thickness of the zeolite membrane is not particularly limited but is typically 0.1 μm or more, preferably 0.6 μm or more, more preferably 1.0 μm or more, and is typically 100 μm or less, preferably 60 μm or less, more preferably 20 μm or less.

According to the present invention, however, a tubular separation membrane that includes a separation membrane other than the zeolite membrane may be used.

The outer diameter of each tubular separation membrane 3 is preferably 3 mm or more, more preferably 6 mm or more, further preferably 10 mm or more, and is preferably 20 mm or less, more preferably 18 mm or less, further preferably 16 mm or less. In some cases where the outer diameter is too small, the tubular separation membrane has insufficient strength and is easy to break. If the outer diameter is too large, then the membrane area per module decreases.

The length of a portion of each tubular separation membrane 3 that is covered by the zeolite membrane is preferably 20 cm or more and is preferably 200 cm or less.

In a separation membrane module according to the present invention, the tubular separation membranes may be single-tube membranes or multi-tube membranes, 1 to 3000 tubular separation membranes, particularly, 50 to 2000 tubular separation membranes are typically provided, and the tubular separation membranes are preferably arranged such that the minimum distance therebetween is 1 mm to 10 mm. The size of the housing and the number of the tubular separation membranes are appropriately changed depending on the amount of the fluid to be processed. The tubular separation membranes may not be coupled by using the joint tube 17. In the description with reference to the drawings, the separation membrane module 1 is vertically installed but may be used with the separation membrane module 1 installed sideways or diagonally.

The fluid to be processed that is a target for separation or concentration in a separation membrane module according to the present invention is not particularly limited provided that the fluid is a gas or liquid mixture that contains components that can be separated or concentrated by using the separation membranes and may be any mixture. The separation membrane module, however, is preferably used for a gas mixture.

A separation or concentration method called a pervaporation method, or a vapor permeation method can be used for the separation or the concentration. The pervaporation method is a separation or concentration method in which a liquid mixture is introduced into each separation membrane as it is and can facilitate a process including the separation or the concentration.

In the case where the mixture to be separated or concentrated according to the present invention is a gas mixture containing components, examples of the gas mixture include a mixture that contains at least one component selected from the group consisting of carbon dioxide, oxygen, nitrogen, hydrogen, methane, ethane, ethylene, propane, propylene, normal butane, isobutane, 1-butene, 2-butene, isobutene, aromatic compounds such as toluene, sulfur hexafluoride, helium, carbon monoxide, nitrogen monoxide, and water. A gas component that has high permeance in mixtures containing these gas components permeates through each separation membrane and is separated. A gas component that has low permeance is concentrated toward a supply gas.

Separation membrane modules according to the present invention can be coupled with each other and used depending on the amount of the fluid, the target degree of the separation or the target degree of the concentration. In the case where the amount of the fluid is large, or in the case where the target degree of the separation or the target degree of the concentration is high, and the process cannot be performed by a single module, a pipe is preferably connected and used such that the fluid that exits the outlet enters the entrance of another module. The target degree of the separation or the target degree of the concentration can be achieved by additional coupling of module depending on the degree of the separation or the degree of the concentration.

Separation membrane modules according to the present invention may be installed in parallel, the fluid may be split, and the gas may be supplied. In this case, modules can be installed in series with the respective modules that are installed in parallel. In the case where the modules are installed in parallel and in series, the amount of the supply gas decreases in the series direction, and linear velocity decreases. Accordingly, the number of the modules that are installed in parallel is preferably decreased to ensure appropriate linear velocity.

In the case where the modules are arranged in series, the component that has permeated through the modules may be discharged from the respective modules or may be discharged after the component is collected with the modules coupled.

The present invention is described in detail by using a specific aspect. However, it is clear for a person skilled in the art that various modifications can be made without departing from the intention and scope of the present invention.

This application Claims the benefit of Japanese Patent Application No. 2018-121043, filed Jun. 26, 2018, hereby incorporated by reference herein in its entirety.

REFERENCE SIGNS LIST

1, 1A, 1B separation membrane module
2 housing
2a, 2b flange
2t support
3 tubular separation membrane
4 end tube
4a tube hole
5, 5R support box (support member)
5J upper half body
5L lower half body
5a insertion hole
5b small hole
5c large hole
5i, 5n nozzle
5r deformation-preventing member
5s bottom
5t top
5u side surface
5v collection chamber
6A bottom cover
6B top cover
6b, 6c flange
6n nozzle
7, 8 baffle
7a, 8a through-hole
9 inlet
10 outlet
11, 12 chamber
13 main chamber (fluid-processing chamber)
14 rod
14A, 14B sheath tube
16 backpressure chamber
20 end plug
30, 31 tubular separation membrane unit
40 bearing member 41 rod
42 ball holder
43 ball
45 base plate
17 coupling rod
50 tubular body
51 baffle
51a center hole
51b opening

The invention claimed is:

1. A separation membrane module comprising:
a tubular housing; and
tubular separation membranes that are arranged in the housing in a longitudinal direction of the housing,
a fluid to be processed flowing through a fluid-processing chamber inside the housing in a direction from one end toward another end of the chamber,
the fluid that has permeated through the tubular separation membranes being retrieved via the tubular separation membranes, and
an end portion of each tubular separation membrane being supported by a support member that is installed in the housing such that the support member extends to cross the housing,
wherein the separation membrane module further comprises:
a collection chamber that is defined in the support member and that is in communication with an inside of each of the tubular separation membranes;
a retrieving member that retrieves the fluid in the collection chamber to outside of the housing;
a backpressure chamber that is defined between the support member and an end portion of the housing; and
a communication portion that communicates an inside of the backpressure chamber to the fluid-processing chamber.

2. The separation membrane module according to claim 1, the communication portion is a gap between an outer circumferential surface of the support member and an inner circumferential surface of the housing.

3. The separation membrane module according to claim 2, wherein a plurality of tubular separation membrane units are disposed in the housing, each unit including the support member and the tubular separation membranes connected thereto; and
wherein the collection chamber of the tubular separation membrane unit nearest to the backpressure chamber is communicated to the collection chamber of the other tubular separation membrane unit via a connection member.

4. The separation membrane module according to claim 3, wherein the connection member is a nozzle that extends from the support member.

5. The separation membrane module according to claim 4, wherein the nozzle extends from each support member, and the nozzle of the tubular separation membrane unit and the nozzle of the tubular separation membrane unit adjacent thereto are coupled with each other.

6. The separation membrane module according to claim 4 or 5, further comprising a bearing member that bears the nozzle on the inner circumferential surface of the housing.

7. The separation membrane module according to claim 6, wherein the bearing member includes a rolling member that is in contact with the inner circumferential surface of the housing and that is capable of rolling.

8. The separation membrane module according to claim 7, wherein the rolling member is pressed against the inner circumferential surface of the housing by using an elastic member.

9. The separation membrane module according to any one of claims 1 to 8, wherein a deformation-preventing member that prevents the support member from deforming is disposed in the collection chamber.

10. The separation membrane module according to any one of claims 1 to 9, wherein the collection chamber is defined by two or more members.

* * * * *